(12) United States Patent
Tang et al.

(10) Patent No.: US 6,553,028 B1
(45) Date of Patent: Apr. 22, 2003

(54) METHOD AND APPARATUS FOR MULTICAST SWITCHING USING A CENTRALIZED SWITCHING ENGINE

(75) Inventors: Cheng Tang, San Jose, CA (US); Chickayya G. Naik, San Jose, CA (US); Jonathan Davar, Los Altos Hills, CA (US); Yiqun Cai, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/302,823

(22) Filed: Apr. 30, 1999

(51) Int. Cl.[7] .............................................. H04L 12/28
(52) U.S. Cl. ..................................... 370/389; 370/390
(58) Field of Search ................................ 370/389, 335, 370/360, 419, 254–256, 390–397, 218, 401–408; 709/223–228, 249

(56) References Cited

U.S. PATENT DOCUMENTS

| | | | |
|---|---|---|---|
| 4,821,265 A | 4/1989 | Albal et al. ............... 370/110.1 |
| 4,864,559 A | 9/1989 | Perlman ........................ 370/60 |
| 4,893,302 A | 1/1990 | Hemmady et al. ............. 370/60 |
| 4,933,937 A | 6/1990 | Konishi .................... 370/85.13 |
| 5,027,350 A | 6/1991 | Marshall ................... 370/85.13 |
| 5,088,032 A | 2/1992 | Bosack ........................ 395/200 |
| 5,138,615 A | 8/1992 | Lamport et al. ............ 370/94.3 |
| 5,140,585 A | 8/1992 | Tomikawa .................. 370/60.1 |
| 5,274,631 A | 12/1993 | Bhardwaj ...................... 370/60 |
| 5,304,992 A | 4/1994 | Harashima ............. 340/825.52 |
| 5,305,311 A | 4/1994 | Lyles .......................... 370/60 |
| 5,313,454 A | 5/1994 | Bustini et al. ................. 370/13 |
| 5,361,256 A | 11/1994 | Doeringer et al. ............. 370/60 |
| 5,394,394 A | 2/1995 | Crowther et al. .............. 370/60 |
| 5,394,402 A | 2/1995 | Ross ......................... 370/94.1 |
| 5,414,704 A | 5/1995 | Spinney ........................ 370/60 |
| 5,418,779 A | 5/1995 | Yemini et al. ................. 370/54 |
| 5,420,862 A | 5/1995 | Perlman ................... 370/85.13 |
| 5,430,715 A | 7/1995 | Corbalis et al. ............... 370/54 |
| 5,473,607 A | 12/1995 | Hausman et al. ........ 370/85.13 |
| 5,500,860 A | 3/1996 | Perlman et al. .......... 370/85.13 |
| 5,511,168 A | 4/1996 | Perlman et al. ........ 395/200.15 |

(List continued on next page.)

OTHER PUBLICATIONS

World Wide Web page http://www.cisco.com/warp/public/558/16.html, *Cisco Catalyst Workgroup Switch Version 3.0*, posted Jul. 15, 1998, pp. 1–5.

(List continued on next page.)

*Primary Examiner*—Wellington Chin
*Assistant Examiner*—Prenell Jones
(74) *Attorney, Agent, or Firm*—Cesari and McKenna, LLP

(57) ABSTRACT

A technique implements forwarding operation shortcuts at a switch for multicast data traffic routed between subnetworks of a computer network. A first multicast frame is forwarded from the switch to a router, which peforms route processing and forwarding operations for a packet encapsulated within the frame. During execution of the operations, the router provides multicast flow and additional information concerning the routed packet to the switch in accordance with a novel multicast shortcut control protocol. The information is used by the switch to implement a novel multicast shortcut for subsequent frames received at the switch having the multicast packet flow.

39 Claims, 6 Drawing Sheets

U.S. PATENT DOCUMENTS

| | | | |
|---|---|---|---|
| 5,548,585 A | 8/1996 | Lagoutte et al. | 370/60 |
| 5,612,959 A | 3/1997 | Takase et al. | 370/390 |
| 5,617,421 A | 4/1997 | Chin et al. | 370/402 |
| 5,633,858 A | 5/1997 | Chang et al. | 370/255 |
| 5,633,869 A | 5/1997 | Burnett et al. | 370/396 |
| 5,636,216 A | 6/1997 | Fox et al. | 370/402 |
| 5,673,263 A | 9/1997 | Basso et al. | 370/396 |
| 5,684,800 A | 11/1997 | Dobbins et al. | 370/401 |
| 5,740,171 A | 4/1998 | Mazzola et al. | 370/392 |
| 5,742,604 A | 4/1998 | Edsall et al. | 370/401 |
| 5,752,003 A | 5/1998 | Hart | 395/500 |
| 5,754,547 A | 5/1998 | Nakazawa | 370/401 |
| 5,764,636 A | 6/1998 | Edsall | 370/401 |
| 5,796,732 A | 8/1998 | Mazzola et al. | 370/362 |
| 5,796,740 A | 8/1998 | Perlman et al. | 370/401 |
| 5,835,720 A | 11/1998 | Nelson et al. | 395/200.54 |
| 5,854,901 A | 12/1998 | Cole et al. | 395/200.75 |
| 5,901,286 A | 5/1999 | Danknick et al. | 395/200.33 |
| 5,910,955 A | 6/1999 | Nishimura et al. | 370/401 |
| 5,968,126 A | 10/1999 | Ekstrom et al. | 709/225 |
| 5,982,773 A | 11/1999 | Nishimura et al. | 370/395 |
| 5,999,536 A | 12/1999 | Kawafuji et al. | 370/401 |
| 6,055,236 A | 4/2000 | Nessett et al. | 370/389 |
| 6,147,993 A * | 11/2000 | Kloth et al. | 370/392 |
| 6,339,791 B1 * | 1/2002 | Dumortier et al. | 709/227 |

OTHER PUBLICATIONS

World Wide Web page http://www.cisco.com/warp/public/538/7.html, *Cisco VLAN Roadmap*, posted Jul. 15, 1998, pp. 1–9.

IAC Newsletter Database, *Cisco Announces New Fast Ethernet Interface,* Apr. 15, 1995, pp. 2–3.

IAC Newsletter Database, *Cisco Announces Token–Ring Switching Products,* Apr. 15, 1995, pp. 4–5.

World Wide Web page http://www.cisco.com/warp/public/146/199.html, *Cisco 7000 Series Gains Fast Ethernet Interface, Becomes Only Router Family to Support Three High–Speed Network Types,* posted Mar. 28, 1995, pp. 1–2.

World Wide Web page http://www.cisco.com/warp/public/741/4.html, *ISL Functional Specification,* posted Jun. 2, 1998, pp. 1–4.

World Wide Web page http://www.cisco.com/warp/public/729/c5000/426 pp.html, *Catalyst 5000 Software Release 2.1 Feature Set,* posted Jun. 2, 1998, pp. 1–9.

IEEE Standards Project, *P802.1Q Draft Standard for Virtual Bridged Local Area Networks,* Feb. 1997, pp. 1–88.

Draft Standard P802.1Q/D10, *IEEE Standards for Local and Metropolitan Area Networks: Virtual Bridged Local Area Networks,* Mar. 22, 1998, pp. 1–212.

World Wide Web page http://www.cisco.com/warp/public/741/8.html, *ISL Configurations for Cisco IOS and the Catalyst 5000,* posted Nov. 5, 1998, pp. 1–8.

Dynamic Inter–Switch Link Protocol, *Configuring DISL,* pp. 2–6.

Catalyst 2820 Series and Catalyst 1900 Series Enterprise Edition Software Configuration Guide, *Virtual LANs,* Chapter 2, pp. 2–1–2–49.

Catalyst 5000 Series Software Configuration Guide, *Configuring VTP and Virtual LANs,* Chapter 13, pp. 13–1–13–24.

Deering et al., Transactions on Computer Systems, *Multicast Routing in Datagram Internetworks and Extended LANs,* vol. 8, No. 2, May 1990, pp. 86–110.

Draft Standard for Virtual Bridged Local Area Networks, P802.1Q/D6, May 16, 1997, pp. 1–10, 70–72.

Deering et al., Computer Communication Review, *An Architecture for Wide–Area Multicast Routing,* 1994, pp. 126–135.

IAC Newsletter Database, *Cisco Introduces VLAN Solution,* Apr. 15, 1995, pp. 6–7.

World Wide Web page http://www.cisco.com/warp/public/534/16.html, *Cisco LAN Switching Products,* Copyright 1996, pp. 1–22.

World Wide Web page http://www.cisco.com/warp/public/614/5.html, *Virtual Networking Services,* posted Sep. 27, 1999, pp. 1–11.

IAC Newsletter Database, *Chipcom and Cisco to Collaborate on ATM Networking Solutions,* Apr. 15, 1995, pp. 3–4.

World Wide Web page http://www.cisco.com/warp/public/614/17.html, *Multicast Routing,* posted Sep. 27, 1999, pp. 1–4.

World Wide Web page http://www.cisco.com/warp/public 614.11.html. *Cisco IOS VLAN Services,* posted Sep. 27, 1999, pp. 1–4.

World Wide Web page http://www.cisco.com/warp/public/558/49.html, *Catalyst 1200 Release 4.0,* posted Sep. 27, 1999, pp. 1–7.

World Wide Web page http://www.cisco.com/warp/public/674.4html, *IP Multicast Streamlines Delivery of Multicast Applications,* Sep. 27, 1999, pp. 1–5.

World Wide Web page http://www.cisco.com/warp/public/732/ciscoios.html, *What Is Cisco IOS Software?,* posted Sep. 27, 1999, pp. 1–2.

World Wide Web page http://www.3com.com/nsc/200374.html, *The Virtual LAN Technology Report,* posted Sep. 27, 1999, pp. 1–23.

World Wide Web page http://www.cisco.com/warp/public/614.12.html, *ATM Internetworking,* posted Sep. 27, 1999, pp. 1–74.

Lucent's and Prominent's Motion For Leave To Amend Their Amended Complaint, United States District Court For the District of Delaware, Civil Action No. 98–349–JJF, Sep. 8, 1998.

W. Fenner, World Wide Web page http://www.ietf.org/rfc/rfc2236.txt, *Internet Group Management Protocol, Version 2,* Nov. 1997, pp. 1–20.

Estrin et al., World Wide Web page http://www.ietf.org/rfc/rfc2362.txt, *Protocol Independent Multicast–Sparse Mode (PIM–SM): Protocol Specification,* Jun. 1998, pp. 1–54.

* cited by examiner

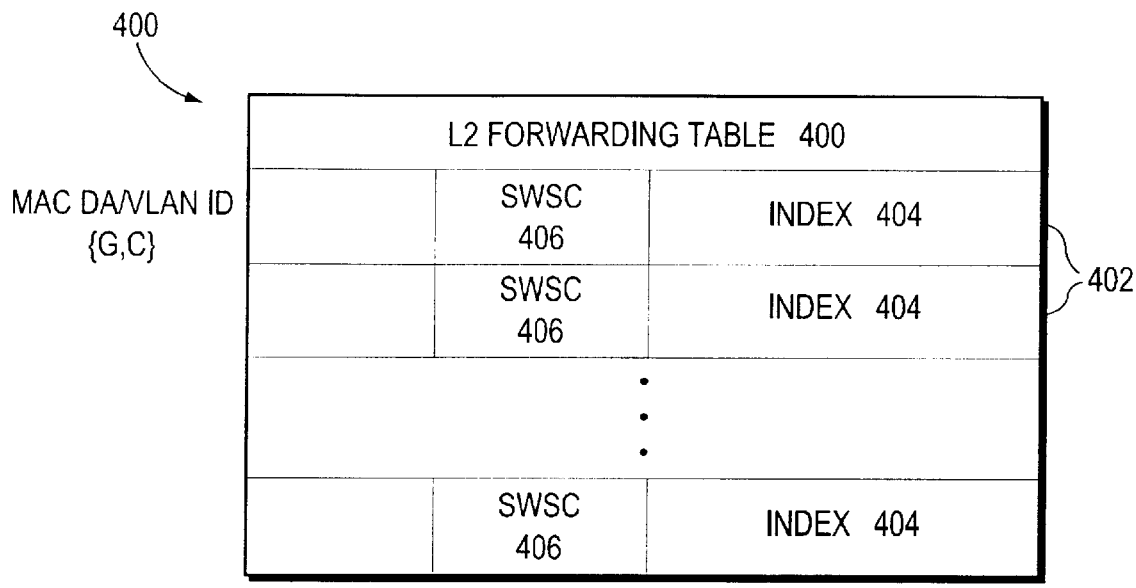
FIG. 4
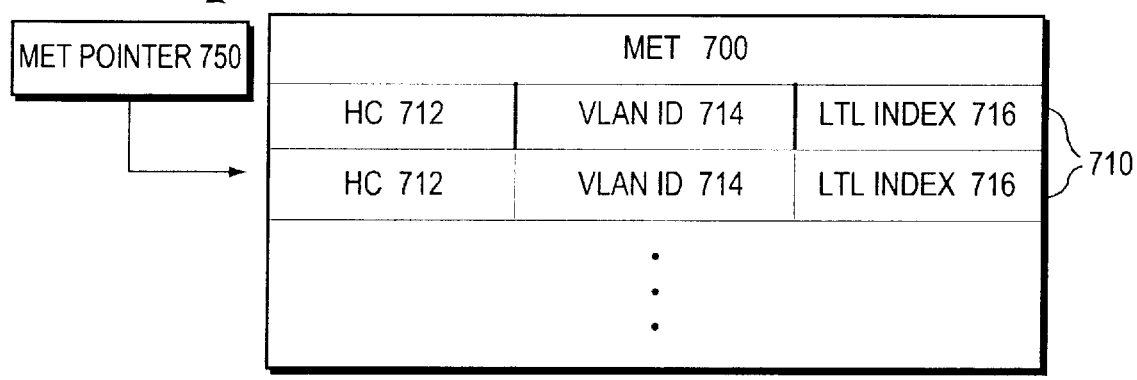
FIG. 7
FIG. 8

METHOD AND APPARATUS FOR MULTICAST SWITCHING USING A CENTRALIZED SWITCHING ENGINE

CROSS-REFERENCE TO RELATED APPLICATIONS

This invention is related to the following copending and commonly-assigned U.S. patent application:

U.S. patent application Ser. No. 08/951,820 titled, Method and Apparatus for Implementing Forwarding Decision Shortcuts at a Network Switch, filed on Oct. 14, 1997.

FIELD OF THE INVENTION

This invention relates generally to computer networks and, more specifically, to routing of multicast packets within a computer network using a switch.

BACKGROUND OF THE INVENTION

Data communication in a computer network involves the exchange of data between two or more entities interconnected by communication links and subnetworks. These entities are typically software programs executing on hardware computer platforms, such as end stations and intermediate stations. Examples of an intermediate station may include a router, bridge or switch which interconnect the communication links and subnetworks to enable transmission of data between the end stations. A local area network (LAN) is an example of a subnetwork that provides relatively short distance communication among the interconnected stations, whereas a wide area network (WAN) enables long distance communication over links provided by public or private telecommunications facilities.

Communication software executing on the stations correlate and manage data communication with other stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an under-lying architecture.

Modern communications network architectures are typically organized as a series of hardware and software levels or "layers" within each station. These layers interact to format data for transfer between, e g., a source station and a destination station communicating over the network. Predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. An example of such a communications architecture is the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications medium 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower network interface layer 120 accepts industry standards defining a flexible network architecture oriented to the implementation of LANs.

Specifically, the network interface layer 120 comprises physical and data link sublayers. The physical layer 126 is concerned with the actual transmission of signals across the communication medium and defines the types of cabling, plugs and connectors used in connection with the medium. The data link layer (i.e., "layer 2") is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the network.

The primary network layer protocol of the Internet architecture is the Internet protocol (IP) contained within the inter network layer 116. IP is a network protocol that provides internetwork routing and relies on transport protocols for end-to-end reliability. An example of such a transport protocol is the Transmission Control Protocol (TCP) contained within the transport layer 114. The term TCP/IP is commonly used to refer to the Internet architecture. Protocol stacks and the TCP/IP reference model are well-known and are, for example, described in Computer Networks by Andrew S. Tannenbaum, printed by Prentice Hall PTR, Upper Saddle River, N.J., 1996.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the medium 180 as bits. Those frame bits are then transmitted over an established connection of medium 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the internetwork layer encapsulates data presented to it by the transport layer within a packet having a network layer header. The network layer header contains, among other information, source and destination (logical) IP network addresses needed to complete the data transfer. The data link layer, in turn, encapsulates the packet in a frame, such as a conventional Ethernet frame, that includes a data link layer header containing information required to complete the data link functions, such as (physical) MAC addresses. At the destination station 150, these encapsulated headers are stripped off one-by-one as the frame propagates up the layers of the stack 175 until it arrives at the receiving process.

A router is an intelligent intermediate node that implements network services such as router processing, path determination and path switching functions. The router also provides interfaces for a wide range of communication links and subnetworks. The route processing function allows a router to determine the type of routing needed for a packet, whereas the path switching function allows a router to accept a packet on one interface and forward it on another interface. The path determination, or forwarding decision, function enables the router to select the most appropriate interface for forwarding the packet.

A switch provides the basic functions of a bridge including filtering of data traffic by MAC address, "learning" of a MAC address based upon a source MAC address of a, frame and ("bridging") forwarding of the frame among its ports based upon a destination MAC address. In addition, the switch provides the path switching capability of a router. Path switching is typically separated from the forwarding decision processing of a router to enable high-speed, interface-level "switching" at the ports of the switch.

U.S. Pat. No. 5,394,402 issued on Feb. 28, 1995 to Floyd E. Ross (the "402 patent") discloses an arrangement that is capable of associating any port of the switch with any particular segregated network group. According to the '402 patent, any number of physical ports of the switch may be associated with any number of groups within the switch by using a virtual local area network (VLAN) arrangement that virtually associates the port with a particular VLAN designation. Specifically, Ross discloses a switch or hub for a segmented virtual local area network with shared media access that associates VLAN designations with at least one internal port and further associates those VLAN designations with messages transmitted from any of the ports to which the VLAN designation has been assigned.

The VLAN designation assigned (e.g., programmed) to each internal port is stored in a memory portion of the switch such that every time a message is received by the switch on an internal port, the VLAN designation of that port is assigned with the message. Association is accomplished by a flow processing element which looks up the VLAN designation in a memory based on the internal port where the message originated. In addition to the '402 patent, an IEEE standards committee is proposing a standard for virtual bridge to local area networks (see IEEE standard 802.1 q).

An objective of the VLAN arrangement described in Ross is to allow all ports and entities of the network having the same VLAN designation to exchange messages by associating a VLAN designation with each message. Those entities having the same VLAN designations function as if they are all part of the same LAN. Each VLAN may be further associated with a subnetwork ("subnet") to provide an organizational overlay to the network that facilitates transmission of data between a group of end stations.

In many cases, the destination of a data frame issued by a source station ("sender") may be more than one, but less than all of the entities ("receivers") on the network; this type of multicast data transfer may further be employed to segregate communication between groups of receivers on the network. IP multicasting, in particular, may be used to disseminate data to a multicast group of receivers on different subnets, but within a single multicast domain of the network. A router interconnects the subnets and executes multicast routing protocols to allow expansion of communication to the end stations of the multicast domain on other subnets.

An example of such a multicast routing protocol is the Protocol Independent Multicast (PIM) protocol used to propagate routing information among routers in a multicast domain. The routers within a multicast domain calculate optimal routes from a sender to receivers of the multicast group and then exchange that information with their neighboring routers to establish paths from the sender to those receivers for multicast traffic. The PIM multicast routing protocol, which is described in detail in Request For Comments (RFC) 2362, defines the interaction between participating routers to create and maintain a multicast distribution tree.

To effect IP multicasting, a sending process generally specifies a destination IP address that is a multicast address for the frame. The multicast destination.IP address is typically a Class D multicast address and the (group) destination MAC address of the frame is directly mapped from that multicast address by, the sending process when generating the frame. Receiving processes typically notify their internetwork layers that they want to receive frames destined for the multicast address; this is called "joining" a multicast group. These receiving members then "listen" on the multicast address and, when a multicast data frame is received at a receiver, it delivers a copy of the data to each process that belongs to the group. An example of a protocol used by an IP host (sending or receiving process of an end station) to report its multicast group membership to an immediately-neighboring multicast router is the Internet Group Management Protocol (IGMP) described in Request for Comments (RFC) 2236. Upon receiving the membership information from a station, the router executes the PIM routing protocol to communicate that membership information to its neighboring routers in the multicast domain.

In addition to performing route processing functions in connection with multicast protocols, the router also executes path determination and switching ("forwarding") operations on the multicast data traffic received on its interfaces. Multicast forwarding operations involve, inter alia, replication of a data packet onto each outgoing router interface having a receiver of the packet. A problem associated with performing such replication operations at the router involves scaleability; that is, the amount of IP multicast traffic that a router can replicate based on its limited resources. In this context, the resources involve the capacity of a processing entity (e.g., a route processor executing layer 3 software processes) within the router to perform replication, in addition to route processing and path determination operations, on incoming packets at substantially high rates.

Specifically if the incoming packet; rate for a multicast traffic flow is higher than the rate at which the route processor can process (e.g., route, replicate and forward) the packets, then subsequent incoming multicast traffic will be dropped. For example, assume a route processor can process incoming packets at a rate of 20,000 packets per second (pps); assume also, however, that the router is receiving multicast packets from multiple sources at an aggregate incoming rate that is greater than 20,000 pps. This situation may arise with a "backbone" router configured to route traffic from many different subnets in an enterprise network. In this case, the route processor quickly becomes overloaded and drops those packets that exceed its 20,000 pps processing rate, thereby creating a "bottleneck" in the network. The present invention is generally directed to solving the problem associated with the amount of multicast traffic a router can forward; in particular, the invention is directed to a technique for offloading multicast forwarding operations from a router to a switch.

SUMMARY OF THE INVENTION

The invention comprises a technique for implementing forwarding operation "shortcuts" at a switch for multicast data traffic routed between subnetworks of a computer network. Broadly stated, a first multicast frame is forwarded from the switch to a router, which performs route processing and forwarding operations for a packet encapsulated within the frame. During execution of the route processing operation, the router provides multicast flow and additional information relating to the routed packet to the switch in accordance with a novel multicast shortcut control protocol (MSCP). The information is used by the switch to implement multicast shortcuts for subsequent frames received at the switch having the multicast packet, flow.

In one aspect of the invention, various hardware components in the switch are configured to perform route lookup, packet rewrite and replication operations offloaded from the router. These hardware components include a layer 2 (L2) forwarding engine,.a layer 3 (L3) forwarding engine and a rewrite/replication engine. Each engine is further associated with a respective data structure, such as a L2 forwarding table, a L3 shortcut table and a multicast expansion table (MET) used to implement the multicast shortcut technique. In another aspect of the invention, the MSCP enables communication between the router (software) and engines (hardware) to, for example, program the table structures. Offloading of the forwarding operations in accordance with the multicast shortcut technique advantageously allows the router to utilize its processing resources for other processing-intensive applications.

During execution of the route processing operation, a multicast shortcut server (MSS) process on the router communicates with a multicast shortcut client (MSC) process on the switch using MSCP to encode and transmit shortcut information between the router and switch. Specifically, the MSS sends a shortcut control message (SCCM) to the MSC which uses the contents of the message to program the table structures of the switch and establish a hardware shortcut for a multicast flow defined in the packet. Thereafter to access the hardware shortcut, three components of the packet are used: an Internet protocol (IP) source address, an IP destination address and an incoming virtual local area network (VLAN) identifier (ID). These three components are preferably hashed to implement a reverse path forwarding (RPF) check in hardware.

In summary, the MSC (i) allocates memory in the MET of the switch; (ii) creates a return MET pointer to that allocated memory, (iii) programs an entry of the L3 shortcut table with information contained within the SCCM message; (iv) stores the MET pointer in a predefined field of the L3 entry; and (v) accesses a corresponding entry of the L2 forwarding table using information contained in the SCCM message.

After programming the tables to establish the hardware shortcut for the IP multicast flow, the MSC responds to the MSS with an acknowledgment message. In response to receiving a positive acknowledgement, the MSS (router) terminates forwarding operations on packets associated with the multicast flow. In addition, the MSS sends a Multicast Fast Drop (MFD) message to the MSC instructing the switch to block all multicast flow (packet) traffic from reaching the router. Upon receiving the MFD message, the MSC locates the shortcut entry in the L3 table, accesses the associated L2 forwarding table entry and reprograms an index in that entry to eliminate a port-select signal for the router, thereby completing the shortcut setup process. Forwarding operations for subsequent frames having the multicast flow are then rendered by hardware logic circuits of the switch rather than by the router.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 4 is a schematic diagram of an embodiment of a layer 2 forwarding table that may be advantageously used with the present invention;

FIG. 7 is diagram of an embodiment of a multicast expansion table that may be advantageously used with the present invention;

FIG. 8 is a schematic diagram of an embodiment of a layer 3 shortcut table that may be advantageously used with the present invention.

DETAILED DESCRIPTION OF AN ILLUSTRATIVE EMBODIMENT

Figure 1:
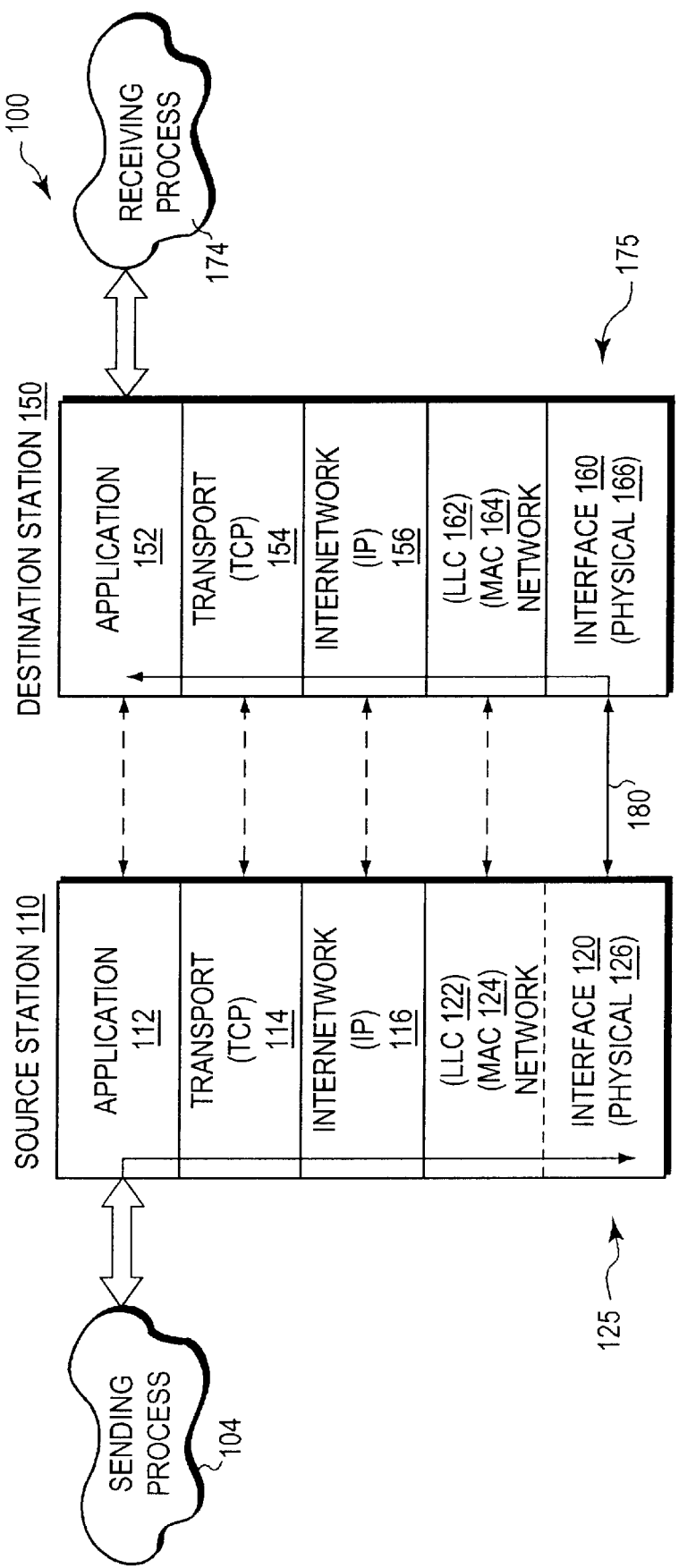
FIG. 1 is a schematic block diagram of prior art communications architecture protocol stacks used to transmit data between stations of a computer network.
Figure 2:
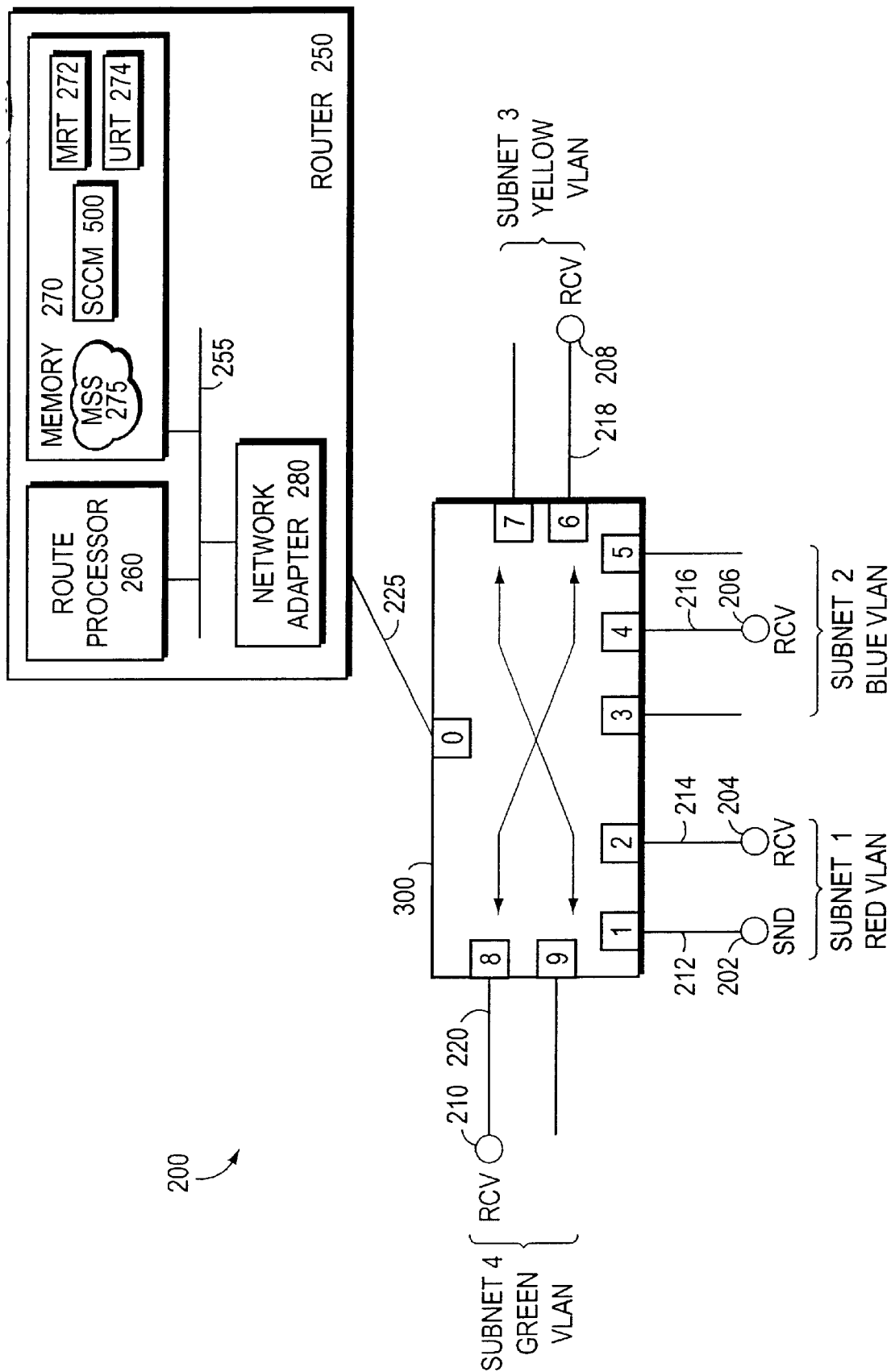
FIG. 2 is a block diagram of a computer network comprising a collection of interconnected communication links and subnetworks attached to a plurality of stations.

FIG. 2 is a block diagram of a computer network 200 comprising a collection of interconnected communication links and subnetworks attached to a plurality of stations. The stations are typically computers comprising end stations 202-210 and intermediate stations 250, 300. The intermediate station 250 is a router and the intermediate station 300 is a network switch; preferably, the intermediate station 300 is a layer 3 (L3) network switch 300 that provides routing capabilities through either an internally-coupled or externally-couple router 250. On the other hand, the end stations 202-210 may comprise personal computers or workstations.

Communication among the stations is effected by exchanging discrete data frames or packets according to a predefined protocol. For the illustrative embodiment described herein, the predefined protocol involves Internet protocol (IP) multicasting, although the invention could be implemented with other multicasting protocols. To effect IP multicasting, a sender station (such as Snd 202) generally specifies a destination IP address. that is a multicast address for the frame. Receiving stations (such as Rcv 204-210) that are members of a multicast group within a multicast domain listen on the multicast address to receive the frame. An example of an IP multicasting protocol used to report membership information about a multicast group to a router is the Internet Group Management Protocol (IGMP) described in Request for Comments (RFC) 2236. Upon receiving the membership information, the router executes a multicast routing protocol to communicate that membership information to its neighboring routers in the multicast domain. An example of a multicasting routing protocol that may be advantageously used with the present invention is the Protocol Independent Multicast (PIM) protocol described in Request for Comments (RFC) 2362.

Each station typically comprises a plurality of interconnected elements, such as a processor, a memory and a network adapter. For example, router 250 comprises route processor 260 coupled to memory 270 and network adapter 280 via bus 255. The memory 270 may comprise storage locations addressable by the processor and adapter for storing software programs and data structures associated with the inventive multicast shortcut technique. The processor 260 may comprise processing elements or, logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the techniques described herein.

Figure 3:
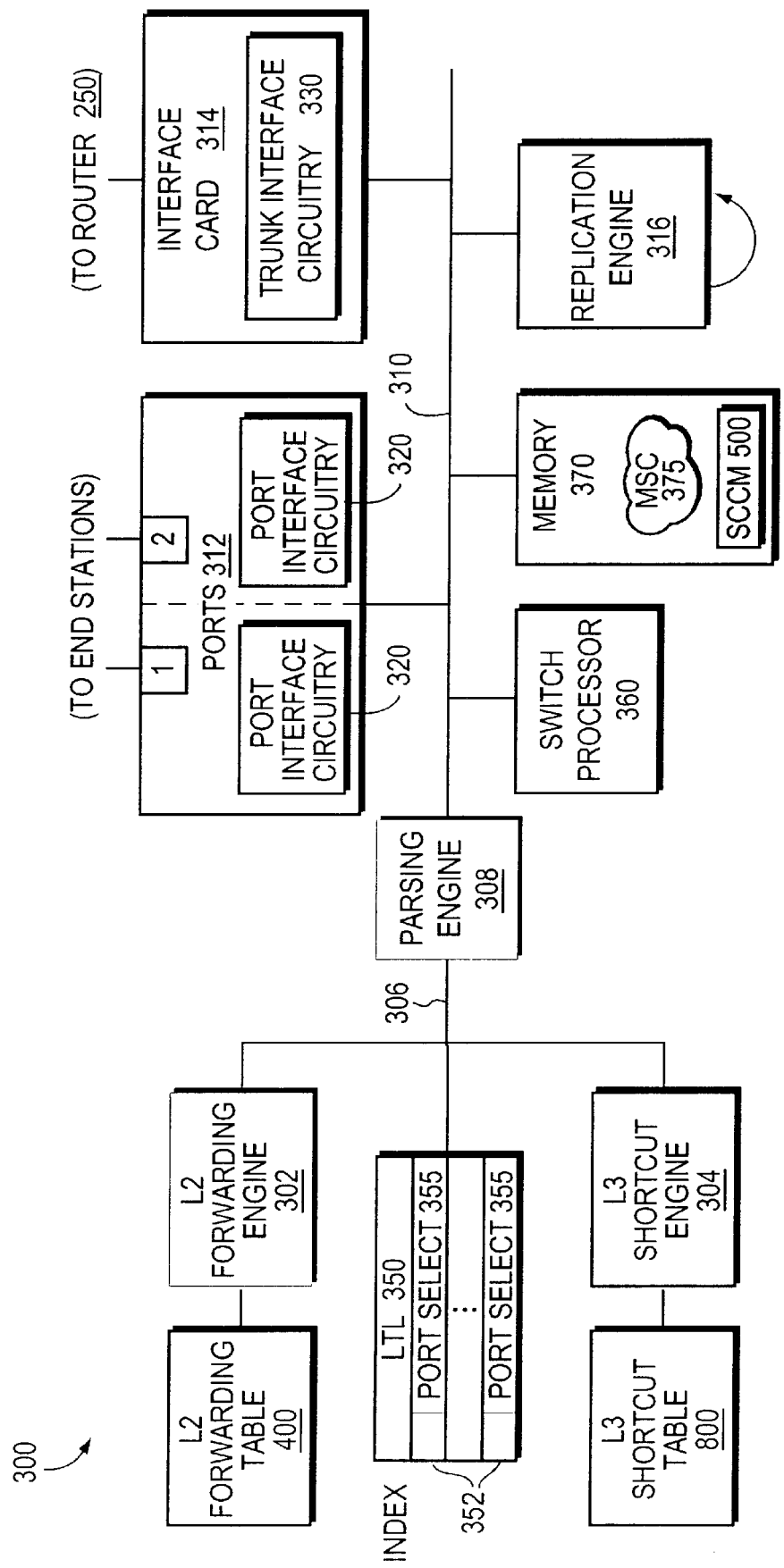
FIG. 3 is a functional block diagram of a network switch configured to implement a novel multicast shortcut technique in accordance with invention.

FIG. 3 is a functional block diagram of the network switch 300 configured to implement the novel multicast shortcut technique in accordance with invention. The switch includes a layer 2 (L2) forwarding engine 302 for accessing and processing information stored in a L2 forwarding table 400, and a L3 shortcut engine 304, coupled to the L2 forwarding engine 302, for accessing and processing information stored in a L3 shortcut table 800. Specifically, the forwarding engine 302 and shortcut engine 304 render forwarding decisions for frames/packets passing through the switch 300 and drive those decisions (e.g., unique index values). over a result bus 306 where they are received by a local target logic (LTL) circuit 350. The LTL 350 then implements the forwarding decisions by mapping the index values to port select signals used to select ports as destinations for receiving data frames transferred over the switching bus 310. In the illustrative embodiment, the engines 302 and 304 are preferably implemented as a plurality of hardware registers and combinational logic configured to produce a sequential logic circuit, such as a state machine.

A switch processor 360 cooperates with the route processor 260 to execute software programs and/or manipulate data structures stored in memory 370 associated with the inventive technique described herein. A central rewrite (i.e., replication) engine 316 may be used to modify multicast frames routed by the switch using rewrite information described herein. In an alternate embodiment of the invention, an in-line rewrite engine (not shown) may be associated with each port and contained on the port card 312.

It will be apparent to those skilled in the art that the rewrite/replication engine comprises conventional circuits for modifying "shortcutted" multicast frames with the rewrite information.

The switch 300 further includes a parsing engine 308 that receives the results from the result bus 306 and drives aggregate information onto a switching bus 310 consisting of data and control bus portions. The parsing engine 308 may further extract pertinent information from packets/frames traversing the switching bus 310 and transfer that information over the result bus 306. Port card ("ports") 312 includes the port interface circuitry 320 needed to. connect the switching bus 310 to the physical media of the network, whereas an interface card 314 incorporates trunk interface circuitry 330 needed to couple the switch 300 to the router 250. It should be noted that there are preferably a plurality of port cards within switch 300 to provide a plurality of ports 1-9, each of which is assigned a unique port index value, as described below.

Referring again to FIG. 2, the L3 multi-port switch 300 includes port 1 coupled to Snd 202 via link 212, port 2 coupled to Rcv 204 via link 214, port 4 coupled Rcv 206 via link 216, port 6 coupled to Rcv 208 via link 218, port 8 coupled to Rcv 210 via link 220 and port R directly coupled to router 250 via a trunk link 225. The trunk link 225 may comprise a physical link (such as a bus or LAN) and associated trunking protocol that cooperate to provide an encapsulation mechanism for efficiently transporting packets or frames, including virtual local area network (VLAN) modified frames, between switches while maintaining the VLAN association of the frames. An example of a trunking mechanism that may be advantageously used with the present invention is described in commonly-assigned U.S. Pat. No. 5,742,604, titled Interswitch Link Mechanism for Connecting High-Performance Network Switches, by Edsall et al.

There are generally two values assigned to each port of the switch 300: a VLAN value and an index value. The index is a hard-coded value that uniquely identifies the port to the switch. An example of a switch configured with index values for identifying ports and suitable for use with the present invention is disclosed in copending and commonly-assigned U.S. Pat. No. 5,796,732, titled Architecture for an Expandable Transaction Based Switching Bus, by Mazzola et al., which patent is hereby incorporated by reference in its entirety.

The VLAN value assigned to each internal port of the switch associates the port with a particular VLAN group within the switch. Each port is thus assigned to a VLAN and there may be multiple ports assigned to the same VLAN. Each VLAN may be further associated with a subnet to provide an organizational overlay to the network that facilitates transmission of data between a group of end stations. To that end, ports 1-2 of the L3 switch are configured as Subnet 1 ("red" VLAN), ports 3-5 are configured as Subnet 2 ("blue" VLAN), ports 6-7 are configured as Subnet 3 ("yellow" VLAN) and ports 8-9 are configured as Subnet 4 ("green" VLAN). The router thus "views" the trunk mechanism interconnecting the switch and router as four (4) interfaces, each associated with a respective VLAN/subnet as defined by the switch.

Since Snd 202 and Rcvs 206-210 are on different subnets, IP multicast data traffic generated by Snd 202 is routed to the Rcvs 206-210 by way of the router 250. Broadly stated, Snd 202 transmits a multicast frame through switch 300 over trunk mechanism to router 250 which then "routes" the multicast packet using, e.g., the PIM protocol. In addition to routing the packet, the router also performs path determination and switching ("forwarding") operations on the packet. Multicast forwarding operations involve, inter alia, replicating a copy of the data packet onto each outgoing interface having a receiver of the packet. Therefore in this example, the route processor generates three (3) copies of the routed packet and sends these replicated packets to the switch. The switch 300 then forwards the routed multicast packets/frames to the receivers Rcvs 206-210 coupled to its ports. A problem associated with performing such replication operations at the router involves its limited capacity to scale in order to handle increases in the rate at which IP multicast frames are processed by the router.

In accordance with the present invention, a technique is provided for implementing forwarding operation shortcuts at a switch for IP multicast data traffic routed between subnetworks of a computer network. Broadly stated, a first multicast frame is forwarded from the switch to a router, which performs route processing and forwarding operations. for a packet encapsulated within the frame. During execution of the route processing operation, the router provides multicast flow and other pertinent information concerning the, routed packet to the switch in accordance with a novel multicast shortcut control protocol (MSCP). The information is used by the switch to implement multicast shortcuts for subsequent frames received at the switch having the multicast packet flow.

Although the invention relates to IP multicast shortcut switching, the first frame of an IP multicast traffic flow received at the switch is routed by the router and, thus, is not shortcutted. Assume Snd 202 transmits IP multicast frame traffic to a multicast group comprising Rcvs 204-210. A first IP multicast frame is received at port 1 (red VLAN) of the switch 300 where it is received and processed by port interface circuitry 320 associated with that ingress port. Broadly stated, the port interface circuitry appends a header to the multicast frame that allows transporting of additional information such as, e.g., a VLAN identifier (ID) value that denotes the incoming red VLAN. The frame is then driven over the switching bus 310 by the port circuitry to the parsing engine 308.

The parsing engine 308 parses the frame to extract pertinent information that is then transferred over the result bus 306. For example, a destination media access control (MAC) address (MAC DA), a source MAC address (MAC SA) and VLAN ID are extracted from the frame and transferred to the L2 forwarding engine 302. In addition, the parsing engine extracts,IP flow information from the packet encapsulated within the frame; the IP flow information includes an IP destination address (IP DA) and an IP source address (IP SA). The parsing engine transfers this IP flow along with the VLAN ID to the L3 shortcut engine 304. In an alternate embodiment, the address and flow information may be parsed from the incoming frame/packet at the port card 312 or the interface card 314.

The L2 forwarding engine 302 then renders a forwarding decision for the frame by accessing the L2 forwarding table. FIG. 4 is a schematic diagram of an embodiment of the L2 forwarding table 400 comprising a plurality of entries 402, each of which is accessed by a group (G) MAC DA and color (C) VLAN ID. Each L2 {G,C} entry 402 further includes, inter alia, an index field 404 containing a unique port index value. The port index value becomes a destination index when there is a "hit" in the forwarding table; the destination index is then used to reference an entry 352 of the LTL 350, which responds by driving port select signals 355 over the switching bus 310. As noted, the port select signals indicate which port(s) that should receive the frame.

One of the receivers of the multicast frame is station 204 attached to port 2, as specified by one of the port select signals 355 provided by the LTL 350. Port 2 is assigned to the same subnet (red VLAN) as the ingress subnet/VLAN; accordingly, the is multicast frame is "bridged", i.e., forwarded.directly, to port 2 without passing to the router. It should be noted that bridging denotes L2 forwarding and, as a result, there is no need to either decrement the contents of a time-to-live (TTL) field of the packet or modify the source MAC address of the frame to reflect routing of the frame by the router.

The remaining receivers of the multicast frame are stations assigned to VLANs other than the ingress red VLAN. Since these receivers are attached to different subnets, a routing operation is needed to route the multicast frame between VLANs. Accordingly, another of the port select signals provided by the LTL 350 specifies trunk port 0 (interface card 314) and the IP multicast frame is forwarded through card 314 and to the router.

The trunk port interface circuitry 330 on card 314 encapsulates the multicast frame within a header that contains, inter alia, the VLAN ID of the incoming red VLAN and the encapsulated frame is passed over the trunk link 225 in a manner that maintains the VLAN association of the frame.

Upon receiving the encapsulated frame at an incoming (red VLAN) interface, an inbound forwarding driver of the router decapsulates the frame and passes the resulting packet onto a routing process (e.g., within internetwork layer 116) where a route processing function is performed on the packet: Specifically, the router performs a look-up operation into a conventional multicast routing table (MRT) 272 for an appropriate entry that specifies outgoing interfaces for the packet. The entry is accessed based on (i) the IP SA, e.g., S; and (ii) the IP DA, which is preferably a multicast group address, e.g., G. For the present example, the look-up operation determines that the packet should be, replicated onto outgoing interfaces blue VLAN, yellow VLAN and green VLAN. As noted, each interface at the router corresponds to a different subnet/VLAN.

At the incoming interface, the router executes a series of software process checks to determine whether the packet should be replicated for transmission over the outgoing interfaces. One of the checks is a Reverse Path Forwarding (RPF) check which is used in multicast forwarding operations to ensure that the router, forwards (replicates) only one copy of a multicast packet. The RPF check is utilized because the router may receive the same multicast packet from different interfaces. For example, a router located in the midst of a computer network (such as the Internet) may receive the same IP multicast packet from two different interfaces because, e.g., a neighboring router has replicated the packet and the replicated copies have traversed redundant paths to the router. Preferably, the router only replicates the packet received from its interface associated with an optimal route as stored in a conventional unicast routing table (URT) 274.

Operationally, the router accesses the URT to determine which of its interfaces is used to reach the IP SA of the packet. The RPF check essentially involves comparing the incoming VLAN interface used to deliver the packet to the router with the VLAN interface returned from the URT. If the. interfaces match, the packet "passes" the RPF check and the router proceeds to forward ("replicate") the packet. If the interfaces do not match, the packet "fails" the RPF check and the router discards the packet. In the illustrative embodiment,. the IP address of the source (Snd 202) is attached to the red VLAN interface; this represents the optimal route to the source and the URT returns the red VLAN interface. Since the incoming interface is the red VLAN interface and the URT specifies the red VLAN interface, then the packet "passes" the PPF check.

Other checks performed at the incoming interface include an Access Control List (ACL) check and a Rate-Limit check, each of which further determines whether the packet is eligible for forwarding. The ACL check generally imposes an access policy, if appropriate, for the interface. The access policy may require, e.g., the interface to "accept any packet having a source IP address S". If the packet has such a source IP address, it passes the ACL check; otherwise, it fails the ACL check and is dropped by the router. The Rate-Limit check is generally imposed at each interface to ensure that only those packets are accepted that meet a specified transfer rate so as to insulate the route processor from being overwhelmed by the multicast traffic. As an example, the interface can only accept packets transferred at a rate of, e.g., 20 pps.

The router also performs similar checks (ACL and Rate-Limit) at each outgoing interface. If the packet passes each inbound and outbound check, it is then replicated (in software) for the particular outgoing interface and the replicated copy of the packet is sent to an outbound forwarding driver of the router. In addition, the router software (i) decrements the TTL field contents of the packet by 1; (ii) rewrites the source MAC address to the router's MAC address, and (iii) recomputes an IP checksum value. The outbound forwarding driver encapsulates each packet within a trunk (e.g., ISL) header that accommodates the appropriate VLAN ID needed to identify the interface NVLAN association of the encapsulated frame over the trunk link. The encapsulated frame is then forwarded over the trunk to trunk port 0 of the switch.

The trunk port interface circuitry 330 on interface card 314 decapsulates the frame and drives it over the switchingbus 310 where it is received by the parsing engine 308.The parsing engine extracts, inter alia, the MAC DA and VLAN ID for transfer to the L2 forwarding engine 302 which uses that information to render a forwarding decision for the routed multicast frame when accessing an appropriate entry 402 of the L2 forwarding table 400. The destination index 404 stored in the accessed entry is provided to the LTL 350, which drives port select signals 355 over the switching bus 310 to select only those ports having a multicast receiver within the specified VLAN/subnet. For example, if the VLAN ID indicates the yellow VLAN of subnet 3, only port 6 attached to Rcv 208 is selected to receive the routed multicast packet. Note that a layer 2 multicast protocol (e.g., the IGMP protocol) is used to manage (populate) the L2 forwarding table and LTL for multicast forwarding operations at the switch.

During execution of the route processing function, the routing software generates a notification to a multicast shortcut server (MSS) process 275 executing on the router.

The notification informs the MSS that the router has processed a packet from a source S in a multicast group G flow and provides additional information to the MSS needed to implement the novel multicast shortcut technique. Upon receiving the notification, the MSS determines whether the multicast flow can be implemented on the switch given the capabilities of the platform. For example, if the switch does not have capability to support ACL checks (in hardware), then the multicast flow cannot be offloaded to the switch.

If all the checks can be implemented by the switch (or if there is no need for such enforcements) then the multicast flow is eligible for IP multicast shortcut switching.

Figure 5:
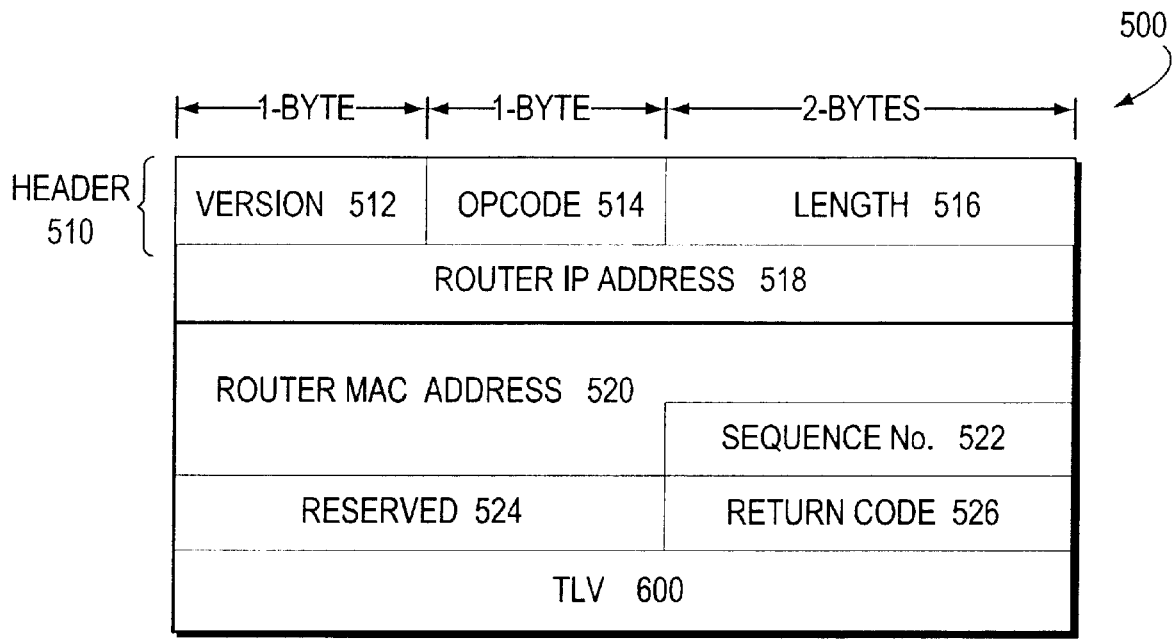
FIG. 5 is a schematic block diagram illustrating the format of a shortcut control message in accordance with the invention.

At this point, the MSS sends a shortcut control message (SCCM) 500 to a multicast shortcut client (MSC) process 375 executing on the switch. The SCCM message is one of a plurality of messages defined by a novel multicast shortcut control protocol (MSCP) used to encode and transmit shortcut information from the router to the switch in accordance with the present invention. FIG. 5 is a schematic block diagram illustrating the format of the SCCM message 500 which comprises a header 510 that includes a version field 512 whose contents specify the current version of the message, an opcode field 514 whose contents specify the type of MSCP message and a length field 516 indicating the entire length of the message. The SCCM message 500 also includes a field 518 containing the router's IP address, a field 520 containing the router's MAC address, a sequence number field 522 containing the sequence number of the message, a reserved field 524 and a return code field 526.

Figure 6:
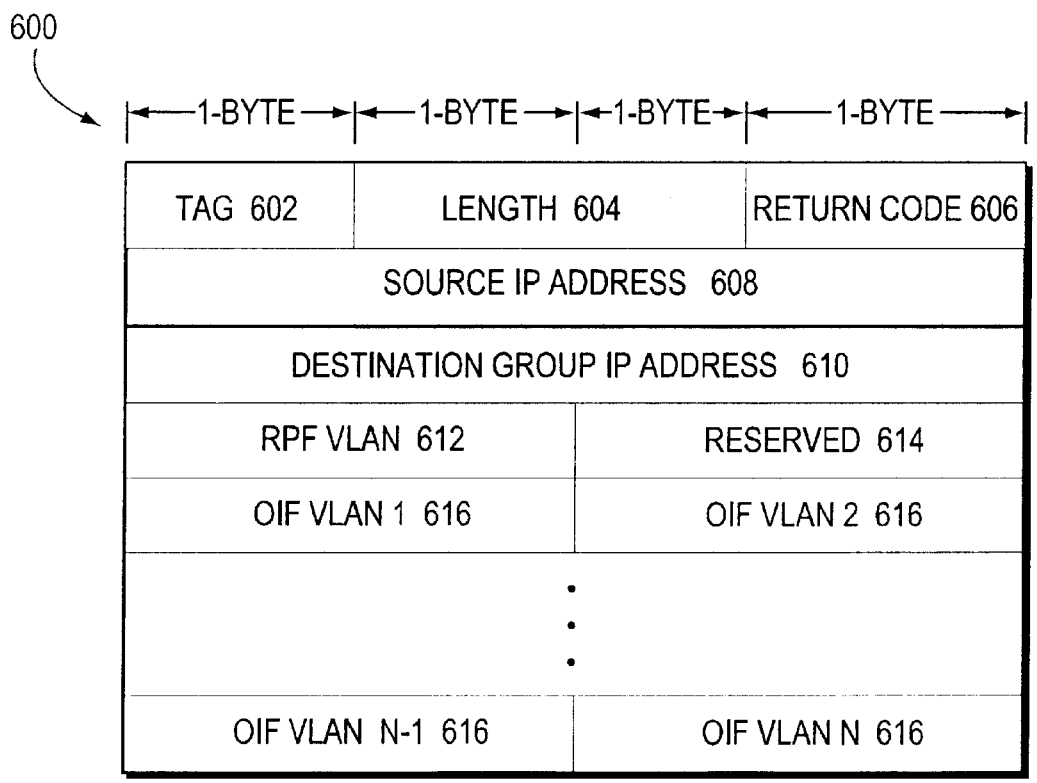
FIG. 6 is a schematic block diagram illustrating the format of a shortcut install TLV appended to the message of FIG. 5.

Appended to SCCM message 500 is one or more type/length/value (TLV) "vector" data structures having a format wherein each TLV 600 defines a {S,G,C} flow, wherein C denotes a VLAN ID "color". An example of a TLV structure that may be advantageously used with the present invention is a Shortcut Install TLV used to install L3 flow information into the L3 shortcut table 800. FIG. 6 is a schematic block diagram of the format of a Shortcut Install TLV 600 that includes a tag field 602 containing a subopcode, a length field 604, a return code field 606, a field 608 containing the source IP address S of the packet, a field 610 containing the destination group IP address G and a field 612 containing the incoming (RPF) VLAN ID C of the packet. In addition, the Shortcut Install TLV 600 contains fields 616 listing outgoing interface (OIF) VLAN IDs for receiving the routed packet.

In response to receiving the SCCM message, the MSC 375 programs the switch by using the contents of the message 500 to create entries in both the L3 shortcut table associated with the L3 forwarding engine 304 and a multicast expansion table (MET) 700 associated with the central rewrite (i.e., replication) engine 316. Specifically, the MSC allocates a piece of memory from the MET and uses the OIF VLAN ID list of the TLV 600 to create entries in the MET table. FIG. 7 is a schematic block diagram of an embodiment of the MET 700 comprising a plurality of entries 710, each having a length of 4 bytes. Each entry 710 further comprises a hardware control (HC) field 712, a VLAN ID field 714 and an LTL index field 716. At this time, the MSC 375 also creates a rewrite engine return (MET) pointer 750 that references the location of this allocated entry.

According to the invention, the MET pointer is stored in each entry of the L3 shortcut table 800. FIG. 8 is a schematic block diagram illustrating an embodiment of the L3 shortcut table 800 comprising a plurality of entries 810. Each entry 810 includes, inter alia, an IP SA field 812, an IP DA field 814, an incoming (RPF) VLAN field 816, a MAC SA field 818, a MAC DA field 820, an LTL index field 822.and at least one control field 824. In the preferred embodiment, the pointer 750 is stored in the MAC DA field 820 of each L3 entry 810. Each L3 multicast entry is further accessed by three components: the IPSA, IPDA and VLAN ID contained in the SCCM message 500. These three components are preferably hashed using a fixed hash algorithm to implement the RPF check in hardware. It should be noted that the LTL index 822 of the L3 entry 810 is local to the switch and not provided by a MSCP control message.

After programming the L3 entry with information obtained by the SCCM message, the MSC accesses an appropriate L2 {G,C} entry of the L2 forwarding table using the group MAC DA address and VLAN ID. The MSC asserts a software shortcut (swsc) bit 406 within the accessed L2 entry 402 to inform the L2 forwarding engine 302 that a shortcut is established for the frame/packet. Assertion of the swsc bit 406 is the last step followed by the MSC when programming the hardware entries of the tables for a multicast flow. In summary, the MSC performs the following programming actions in response to the SCCM message provided by the MSS: (i) allocates memory in the MET table; (ii) associates a MET pointer to the allocated memory, (iii) programs the L3 entry with information contained within the SCCM message; (iv) stores the MET pointer in the MAC DA field of the L3 entry; (v) locates a corresponding L2 entry using a group MAC DA and VLAN ID color {G,C}; and (vi) asserts the swsc bit of the L2 entry.

After programming the tables on the switch to establish the hardware shortcut for the IP multicast flow, the MSC responds to the MSS with an acknowledgment message. The acknowledgment is a shortcut acknowledgment message having a frame format similar to the SCCM message 500, but with a different opcode in field 514. In some cases, the acknowledgement message may indicate a negative response to the attempted establishment of a multicast hardware shortcut at the switch; in those cases, the return code field 526 carries any error information associated with the transmission of the SCCM message 500. An example of such error information is a code specifying that a shortcut cannot be programmed in hardware because of insufficient resources (such as unallocated table entries).

Figure 9:
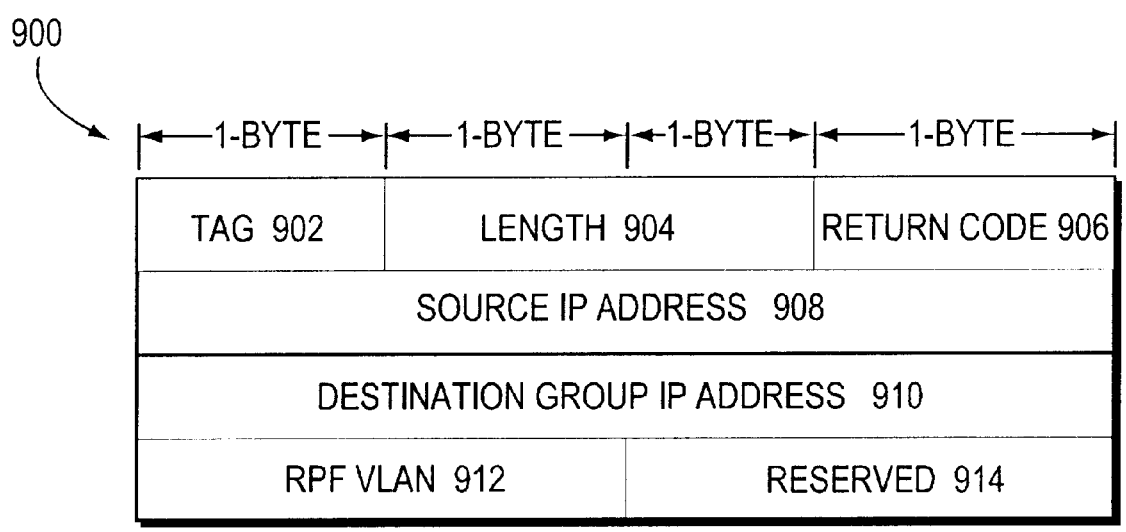
FIG. 9 is a schematic block diagram illustrating the format of a multicast fast drop (MFD) install TLV appended to a MFD message in accordance with invention.

However in response to receiving a positive acknowledgement from the MSC, the MSS (router) terminates forwarding operations on packets associated with the multicast flow. Here, the MSS may send another MSCP message, i.e., a Multicast Fast Drop (MFD) message, to the MSC instructing the switch to block all multicast traffic having a specified IP multicast flow from reaching the router. The MFD message format is also similar to the SCCM message 500, but with different contents of the opcode field 514; in addition, a MFD Install TLV is appended to the MFD message. FIG. 9 is a schematic block diagram of the format of the MFD Install TLV 900 that includes a tag field 902 containing a subopcode, a length field 904, a return code field 906, a field 908 containing the source IP address of the packets to be blocked, a field 910 containing the destination group IP address of the packets to be blocked, a field 912 containing the incoming RPF VLAN ID of the packets to be blocked and a reserved field 914. In response to the MFD message, the MSC 375 utilizes the appropriate fields of the message to locate the appropriate shortcut entry 810 in table 800, and thereafter access the associated L2 forwarding table entry 402 and reprogram the contents of the index field 404 in that entry to eliminate the port-select signal for the router. This completes the shortcut setup process.

For a subsequent IP multicast frame received from source S at port 1 (red VLAN) of the switch, the parsing engine parses the frame so that the L2 and L3 engines can perform look-ups into their respective tables independently and simultaneously, with the L2 engine using the group MAC DA and incoming VLAN ID color, and the L3 engine using the IPDA, IPSA and incoming VLAN7 ID. If there are "hits" in the tables, information returned from the tables and driven over the switching bus includes an MET pointer, MAC SA, LTL index and an indication that the swsc bit is asserted in the L2 table entry. This latter indication triggers the replication engine 316 to honor the L3 information, rather than the L2 information on the bus. However, the LTL index 822 (which is returned from the L3 table 800) is used by the L2 forwarding engine to bridge the multicast frame to a multicast receiver on the ingress VLAN (port 2).

The replication engine uses the L3 information, including the MET pointer, MAC SA and LTL index to perform the necessary replication operations. Note that the LTL index 822 specifies the replication engine and not the router as a destination of the packet/frame. That is, the LTL index enables the replication engine to perform multicast packet replication while also implementing MFD (block-to-router); as noted, the index 822 further specifies port select signals associated with the incoming (ingress) VLAN, e.g., port 2 of the red VLAN. For frames destined to ports on VLANs other than the ingress VLAN, the replication engine rewrites those frames.

Specifically, each port on the switch receives the frame driven over the switching bus 310 and the port select signals derived from the LTI index instruct only those selected ports to "keep" the frame; all other ports discard the frame The replication engine 316 starts with an egress VLAN entry, replicates it over the switching bus and then issues the index to the LTL 350 which provides the port select signals that select the appropriate ports within that VLAN. When the replication engine rewrites the frame routed to, e.g., the blue VLAN, only certain of those ports are selected to accept the frame. The replication engine "reads in" the MET pointer 750 from the L3 entry and locates the corresponding entry in the MET table 700. There is an entry in the MET table for each outgoing VLAN; i.e., each MET entry 710 includes an outgoing (egress) VLAN ID 714 and LTL index 716 used for translation to signals that select the ports of the egress VLAN that should receive the frame.

When rewriting the header of a routed frame, the replication engine decrements TTL, rewrites the MAC SA to denote the router, recomputes IP checksum and then replicates the frame to, e.g., the blue VLAN. Replication is performed by selecting only those ports that receive asserted port-select signals. This replication process continues for each outgoing VLAN. Operationally, the replication engine 316 accesses each MET entry 700 sequentially (starting from the location referenced by the MET pointer 750) until it reaches an entry having an asserted control bit (within the HC field 712) that specifies termination of replication for the frame. The process described above is then repeated for the next frame/packet having the same IP multicast flow.

The foregoing description has been directed to specific embodiments of this invention. It will be apparent, however, that other variations and modifications may be made to the described embodiments, with the attainment of some or all of their advantages. Therefore, it is the object of:the appended claims to cover all such variations and modifications as come within the true spirit and scope of the invention.

What is claimed is:

1. A method for operating a switch, the method comprising the steps of:

forwarding a multicast frame received at the switch to a router;

performing route processing and forwarding operations for a packet encapsulated within the frame;

receiving multicast flow and additional information relating to the packet from the router, the information received in a multicast shortcut protocol (MSCP) from the router and received by a multicast shortcut client (MSC) process on the switch; and implementing multicast shortcuts at the switch for subsequent multicast frames having the multicast flow using the information provided by the router.

2. A method for implementing forwarding operation shortcuts at a switch for multicast frames routed between subnetworks of a computer network, the method comprising the steps of:

forwarding a multicast frame received at the switch to a router;

performing route processing and forwarding operations for a packet encapsulated within the frame;

providing multicast flow and additional information relating to the packet from the router to the switch, the router executing a multicast shortcut server (MSS) process transmitting using a multicast shortcut control protocol (MSCP) the information to a multicast shortcut client process (MSC) on the switch; and implementing multicast shortcuts at the switch for subsequent multicast frames having the multicast flow using the information provided by the router.

3. The method of claim 2 further comprising the step of creating a shortcut control message (SCCM) at the MSS, the SCCM containing an Internet protocol (IP) address of the router and a media access control (MAC) address of the router.

4. The method of claim 3 further comprising the step of creating a shortcut install type/length/value (TLV) structure defining the multicast flow at the MSS, the shortcut install TVL containing a source IP address (IP SA) of the packet, a destination group IP address (IP DA) of the packet, an incoming interface virtual local area network (VLAN) identifier (ID) of the packet and a list of outgoing interface VLAN IDs for receiving the packet.

5. The method of claim 4 further comprising the step of appending the shortcut install TLV to the SCCM at the MSS for transmission to the MSC.

6. The method of claim 5 wherein the step of implementing multicast shortcuts comprises the step of programming table structures in the switch using contents of the SCCM and appended TLV to establish a hardware shortcut at the switch for the multicast flow defined in the TLV.

7. The method of claim 6 wherein the step of programming comprises the steps of:

allocating memory in a multicast expansion table (MET) of the switch; and creating a return MET pointer to the allocated memory.

8. The method of claim 7 wherein the step of programming further comprises the steps of:

programming an entry of a layer 3 (L3) shortcut table with information contained within the SCCM; and storing the return MET pointer in a predefined field of the L3 entry.

9. The method of claim 8 wherein the step of programming further comprises the steps of:

accessing a corresponding entry of a layer 2 (L2) forwarding table using information contained in the SCCM; and asserting a shortcut bit of the accessed L2 entry.

10. The method of claim 9 further comprising the steps of, after programming the table structures to establish the hardware shortcut at the switch for the multicast flow:

creating a positive acknowledgment message at the MSC; and responding to the SCCM transmitted by the MSS with the acknowledgment message.

11. The method of claim 10 further comprising the step of accessing the hardware shortcut using the IP SA, IP DA and incoming VLAN ID of the packet.

12. The method of claim 11 further comprising the step of implementing a reverse path forwarding (RPF) check in hardware by hashing the IP SA, IP DA and incoming VLAN ID.

13. The method of claim 12 further comprising the step of, in response to receiving the positive acknowledgment, terminating forwarding operations at the MSS for subsequent packets having the multicast flow.

14. The method of claim 13 further comprising the steps of:

creating a multicast fast drop (MFD) message at the MSS, the MFD message instructing the switch to block multicast traffic having a specified multicast flow from reaching the router;

creating a MFD install TLV at the MSS, the MFD install TLV containing a source IP address of the packets to be blocked, a destination group IP address of the packets to be blocked and an incoming interface VLAN ID of the packets to be blocked; and appending the MFD install TLV to the MFD message at the MSS for transmission to the MSC.

15. The method of claim 14 further comprising the steps of, in response to receiving the MFD message at the MSC:

locating an appropriate entry in the L3 table using contents of the MFD message;

accessing an entry of the L2 forwarding table associated with the L3 entry; and reprogramming contents of an index field of the L3 entry to eliminate a port-select signal destined for the router.

16. Apparatus for implementing forwarding operation shortcuts at a switch for multicast frames routed between subnetworks of a computer network, the apparatus comprising:

a layer 2 (L2) forwarding engine adapted to render a decision to forward a multicast frame received at the switch to a router;

a route processor of the router adapted to perform route processing and forwarding operations for a packet encapsulated within the multicast frame;

a multicast shortcut server (MSS) executed by the route processor to provide multicast flow and additional information relating to the packet from the router to the switch in accordance with a multicast shortcut control protocol (MSCP); and a multicast shortcut client (MSC) executed by a switch processor of the switch and cooperating with the MSS to implement multicast shortcuts at the switch for subsequent multicast frames having the multicast flow in accordance with the information provided by the router.

17. The apparatus of claim 16 wherein the MSC and MSS cooperate to program a plurality of table structures in the switch using contents of a shortcut install type/length/value (TLV) structure appended to a shortcut control message (SCCM), the shortcut install TLV defining the multicast flow.

18. The apparatus of claim 17 wherein one of the plurality of table structures is a multicast expansion table (MET) and wherein the MSC (i) allocates memory in the MET and (ii) creates a return MET pointer to the allocated memory.

19. The apparatus of claim 18 wherein another of the plurality of table structures is a layer 3 (L3) shortcut table and wherein the MSC (i) programs an entry of the L3 shortcut table with information contained within the SCCM and (ii) stores the return MET pointer in a predefined field of the L3 entry.

20. The apparatus of claim 19 wherein another of the plurality of table structures is a layer 2 (L2) forwarding table and wherein the MSC (i) accesses a corresponding entry of the L2 forwarding table using information contained in the SCCM and (ii) asserts a shortcut bit of the accessed L2 entry.

21. The method as in claim 1 further comprising:

the router executing a multicast shortcut server (MSS) process to transmit the information in a multicast shortcut control protocol (MSCP).

22. The method of claim 1 further comprising:

creating a shortcut control message (SCCM) by the router using the MSS, the SCCM containing an Internet protocol (IP) address of the router and a media access control (MAC) address of the router.

23. The method of claim 22 further comprising:

creating, at the router, by a multicast shortcut server (MSS) process a shortcut install type/length/value (TLV) structure defining the multicast flow at the MSS, the shortcut install TLV containing a source IP address (IP SA) of the packet, a destination group IP address (IP DA) of the packet, an incoming interface virtual local area network (VLAN) identifier (ID) of the packet and a list of outgoing interface VLAN IDs for receiving the packet.

24. The method of claim 23, further comprising:

appending the shortcut install TLV to the SCCM at the MSS for transmission to the MSC.

25. The method of claim 23, further comprising:

programming table structures in the switch using contents of the SCCM and TLV to establish a hardware shortcut at the switch for the multicast flow defined in the TLV.

26. The method of claim 23, further comprising:

allocating memory in a multicast expansion table (MET) of the switch; and creating a return MET pointer to the allocated memory.

27. The method of claim 23 further comprising:

programming an entry of a layer 3 (L3) shortcut table in the switch with information contained within the SCCM; and storing the return MET pointer in a predefined field of the L3 entry.

28. The method of claim 23, further comprising:

accessing in the switch a corresponding entry of a layer 2 (L2) forwarding table using information contained in the SCCM; and asserting a shortcut bit of the accessed L2 entry.

29. The method of claim 28, further comprising:

creating, by the switch, a positive acknowledgment message at the MSC; and responding to the SCCM transmitted by the MSS with the acknowledgment message.

30. The method of claim 1, further comprising:

accessing the switch hardware shortcut using a IP SA, IP DA and incoming VLAN ID of the subsequent frame.

31. The method of claim 1, further comprising:

implementing, in the switch, a reverse path forwarding (RPF) check in hardware by hashing the IP SA, IP DA and incoming VLAN ID of the subsequent frame.

32. The method of claim 31, further comprising:

terminating by the router, in response to receiving the positive acknowledgment, forwarding operations at the MSS for subsequent packets having the multicast flow.

33. The method of claim 21, further comprising:

creating, in the router, a multicast fast drop (MFD) message at the MSS, the MFD message instructing the switch to block multicast traffic having a specified multicast flow from reaching the router;

creating a MFD install TLV at the MSS, the MFD install TLV containing a source IP address of the packets to be blocked, a destination group IP address of the packets to be blocked and an incoming interface VLAN ID of the packets to be blocked; and appending the MFD install TLV to the MFD message at the MSS for transmission to the MSC in the switch.

34. The method as in claim 33, further comprising:

eliminating by the switch, in response to receiving the MFD, a port-select signal used to direct the multicast traffic to the router.

35. A switch coupled to a router, comprising:

a forwarding engine to forward a multicast packet received at the switch to the router;

a route processor of the router to perform route processing and forwarding operations for the packet;

a multicast shortcut server (MSS) process of the router to provide multicast flow and additional information (hereinafter information) relating to the packet, and to transmit the information in a multicast shortcut protocol (MSCP) to the switch;

a multicast shortcut client (MSC) process in the switch to receive the information from the router; and hardware in the switch to implement multicast shortcuts for subsequent multicast frames having the multicast flow using the information provided by the router.

36. A switch coupled to a router, comprising:

a forwarding engine to forward a multicast packet received at the switch to the router;

a route processor of the router to perform route processing and forwarding operations for the packet;

means for providing multicast flow and additional information (hereinafter information) relating to the packet by a multicast shortcut server (MSS) process of the router;

means for transmitting the information in a multicast shortcut protocol (MSCP) to the switch;

means for receiving the information from the router in a multicast shortcut client (MSC) process in the switch; and means for implementing multicast shortcuts for subsequent multicast frames having the multicast flow using the information provided by the router.

37. A method for operating a switch coupled to a router, comprising:

forwarding a multicast packet received at the switch to the router;

performing, by the router, route processing and forwarding operations for the packet;

providing multicast flow and additional information (hereinafter information) relating to the packet by a multicast shortcut server (MSS) process of the router;

transmitting the information in a multicast shortcut protocol (MSCP) to the switch;

receiving the information from the router in a multicast shortcut client (MSC) process in the switch; and implementing multicast shortcuts for subsequent multicast frames having the multicast flow using the information provided by the router.

38. A computer readable media, comprising:

instructions for execution on a processor for the practice of the method of claim 1 or claim 2 or claim 37.

39. Electromagnetic signals propagating on a computer network, comprising:

said electromagnetic signals carrying instructions for execution on a processor for the practice of the method of claim 1 or claim 2 or claim 37.

* * * * *